(12) United States Patent
Kitajima et al.

(10) Patent No.: US 6,361,626 B1
(45) Date of Patent: Mar. 26, 2002

(54) SOLDER ALLOY AND SOLDERED BOND

(75) Inventors: Masayuki Kitajima; Hitoshi Homma; Masakazu Takesue; Tadaaki Shono; Yutaka Noda, all of Kawasaki (JP)

(73) Assignee: Fujitsu Limited, Kawaski (JP)

( * ) Notice: Subject to any disclaimer, the term of this patent is extended or adjusted under 35 U.S.C. 154(b) by 0 days.

(21) Appl. No.: 09/839,371

(22) Filed: Apr. 23, 2001

(30) Foreign Application Priority Data

Oct. 24, 2000 (JP) .................................... 2000-324546

(51) Int. Cl.[7] .......................... C22C 13/00; B23K 35/26
(52) U.S. Cl. ...................... 148/400; 420/557; 420/562; 228/56.3
(58) Field of Search .................. 148/400; 420/557, 420/562; 228/56.3

(56) References Cited

FOREIGN PATENT DOCUMENTS

JP          20000 15478      *  1/2000

* cited by examiner

Primary Examiner—Sikyin Ip
(74) Attorney, Agent, or Firm—Armstrong, Westerman & Hattori, LLP

(57) ABSTRACT

A Pb-free solder alloy and a soldered bond using the same, in which the solder alloy has no harmful environmental effect but has a solderability comparable to that of the conventional Pb—Sn solder alloy. The solder alloy of the present invention either consists of Zn: 3.0–14.0 wt %, Al: 0.0020–0.0080 wt %, and the balance of Sn and unavoidable impurities or consists of Zn: 3.0–14.0 wt %, Bi: 3.0–6.0 wt %, Al: 0.0020–0.0100 wt %, and the balance of Sn and unavoidable impurities. The soldered bond of the present invention consists of either of the present inventive solder alloys.

4 Claims, 12 Drawing Sheets

SOLDER ALLOY AND SOLDERED BOND

BACKGROUND OF THE INVENTION

1. Field of the Invention

The present invention relates to a solder alloy, and a soldered bond of an electric or electronic device, that has improved environmental safety.

2. Description of the Related Art

Lead-tin (Pb—Sn) solder alloys have conventionally been used in a large amount for solder bonding of various kinds of electric and electronic devices because they have a low melting point and good wettability even in oxidizing atmosphere such as air. However, because of the toxicity of Pb, regulations have been imposed on the services and operations using Pb and Pb-containing alloys, so that the occurrence of Pb-intoxation has been heretofore minimized.

Recent increase in the concern about environmental disruption is raising questions about the disposal of various industrial devices using Pb-containing solder alloys, such as electric and electronic devices.

The electric and electronic devices have been generally disposed of by reclamation as in the case of usual industrial and nonindustrial wastes. However, concern about the impact of harmful effect on environment and living organism, caused by elution of Pb if a large amount of electric or electronic device wastes including Pb-containing solder alloys, is kept being disposed by reclamation without pretreatment.

In the near future, it will probably be made compulsory to collect Pb from used electric and electronic devices, which include a large amount of Pb-containing solder alloy, before disposal.

However, it is not yet technologically possible to remove Pb efficiently and effectively from the used electric and electronic devices. It is also possible that the Pb collection cost would cause an increase in the product cost.

Therefore, it is strongly desired that a Pb-free solder alloy containing no Pb is developed.

As a Pb-free solder alloy, a Sn-based alloy containing combined additives such as Zn, Ag, Bi and Cu has been put into practical use, but only in limited special applications. This is because the alloy does not have good solderability, i.e. the essential properties of the conventional Pb—Sn solder alloy for general applications such as low melting point, good wettability, capability for reflow treatment, freedom from reaction with the base material that would cause formation of a brittle compound layer or an embrittled layer.

Sn—Zn solder alloy is most useful Pb-free solder alloy at present. Sn—Zn solder alloy has a melting point of near 200° C. and is expected to provide a replacement for the conventional Sn—Pb alloy.

However, Zn easily oxidizes and has poor solder wettability and it is necessary to use nitrogen gas or other non-oxidizing atmospheres in order to ensure good solderability.

To provide Sn—Zn solder alloy with an improved wettability, the addition of Cu or Ge was proposed but this did not provide an expected improvement in wettability. Instead, the Cu addition causes rapid formation of Cu—Zn intermetallic compound in the solder alloy to deteriorate the properties of the solder alloy.

Moreover, Zn has so high an activity that, when soldering is effected on a Cu base material, a thick layer of Cu—Zn intermetallic compound easily forms even with a small heat input to reduce the bond strength. In this case, the base material/solder interface presumably has a structure of Cu base/β'- CuZn layer/γ- $Cu_5Zn_8$ layer/solder layer. A Cu—Zn intermetallic compound has a very weak bond strength at the interface with the solder and this causes exfoliation to easily occur. This cannot be avoided if the Cu base material is coated with Ni/Au, Pd or Pd/Au plating.

Therefore, Sn—Zn solder alloy has not yet been put into practical use from the viewpoint of the reliability of electronic devices.

SUMMARY OF THE INVENTION

The object of the present invention is to provide a Pb-free solder alloy and a soldered bond using the same, in which the solder alloy has no harmful environmental effect but has a solderability comparable to that of the conventional Pb—Sn solder alloy.

To achieve the object according to the first aspect of the present invention, there is provided a solder alloy consisting of:

Zn: 3.0–14.0 wt %,

Al: 0.0020–0.0080 wt %, and the balance of Sn and unavoidable impurities.

According to the first aspect, there is also provided a soldered bond of an electric or electronic device, said bond being composed of a solder alloy consisting of:

Zn: 3.0–14.0 wt %,

Al: 0.0020–0.0080 wt %, and the balance of Sn and unavoidable impurities.

According to the second aspect of the present invention, there is provided a solder alloy consisting of:

Zn: 3.0–14.0 wt %,

Bi: 3.0–6.0 wt %,

Al: 0.0020–0.0100 wt %, and the balance of Sn and unavoidable impurities.

According to the second aspect, there is also provided a soldered bond of an electric or electronic device, said bond being composed of a solder alloy consisting of:

Zn: 3.0–14.0 wt %,

Bi: 3.0–6.0 wt %,

Al: 0.0020–0.0100 wt %, and the balance of Sn and unavoidable impurities.

The contents of the component elements are limited for the following reasons.

Zn: 3–14 wt % (1st and 2nd Aspects)

Zn is an essential component to provide a low melting point and improved wettability of the solder alloy. The Zn content of 3–14 wt % stably ensures good wettability. A Zn content of either less than 3 wt % or more than 14 wt % deteriorates the wettability.

Al: 0.0020–0.0080 wt % (1st Aspect, Bi Absent)

Al: 0.0020–0.0100 wt % (2nd Aspect, Bi Present)

Al suppresses oxidation of Sn—Zn alloy to ensure good wettability. As heretofore described, Zn easily oxidizes to form an oxide film on the solder layer that intervenes between the solder layer and a base material and blocks wetting of the base material by the solder. To ensure the oxidation suppression effect, Al must be present in an amount of 0.0020 wt % or more. However, experiments have shown that an excessive amount of Al deteriorates the wettability. Therefore, the Al content must not be more than 0.0080 wt % for the alloy of the first aspect and must not be more than 0.0100 wt % for the alloy of the second aspect.

Bi: 3.0–6.0 wt % (2nd Aspect)

Bi further lowers the melting point and improves the wettability of the solder alloy. To ensure this effect, the Bi content must be 3.0 wt % or more. However, excessive amounts of Bi cause the solder to have an excessively high hardness causing embrittlement, so that a reliable soldered bond cannot be obtained. Therefore, the Bi content must not be more than 6.0 wt.

Solder alloys, particularly solder alloys for soldering of electric or electronic devices must have the following properties.

1) Soldering can be effected at a low temperature as close as possible to that of the conventional Sn—Pb eutectic solder alloy. Specifically, the soldering temperature should not be far above 200° C., preferably not higher than about 220° C.
2) Good wetting with the base material is ensured.
3) No brittle intermetallic compounds and no embrittled layers are formed by reaction of the solder alloy with the base material.
4) The alloying elements form no oxides which cause occurrence of poor wetting, voids, bridges or other defects.
5) The solder alloy can be provided in a form suitable for working and feeding in soldering on mass production lines, for example, in a solder paste form, a solder ball form for BGA, etc.

The present invention provides a Zn—Al—Sn solder alloy and a Zn—Bi—Al—Sn solder alloy not only having an improved environmental safety but also satisfying the above-summarized property requirements.

DESCRIPTION OF THE PREFERRED EMBODIMENT

Solder alloys having different chemical compositions, as summarized in Tables 1 and 2, were produced by melting and the melting point (liquidus temperature), the time to wetting and the bond strength were measured by the following methods.

Measuring Melting Point

The DSC melting point measuring method (differential scanning calorimetry) was used to determine the liquidus temperature as a representative of melting point.

Measuring Time to Wetting

A Lesca Meniscus Tester (Solder Checker Model SAT-5000) was used to determine the time to wetting as a representative of the wettability by the following meniscus test. The testing atmosphere was air. To study the influence of the oxygen concentration of the atmosphere, Samples No. 45 and No. 61, which had the same chemical compositions as those of Samples No. 44 and 60, respectively, were tested in a nitrogen atmosphere containing 2000 ppm oxygen.

Meniscus Test

Figure 1:
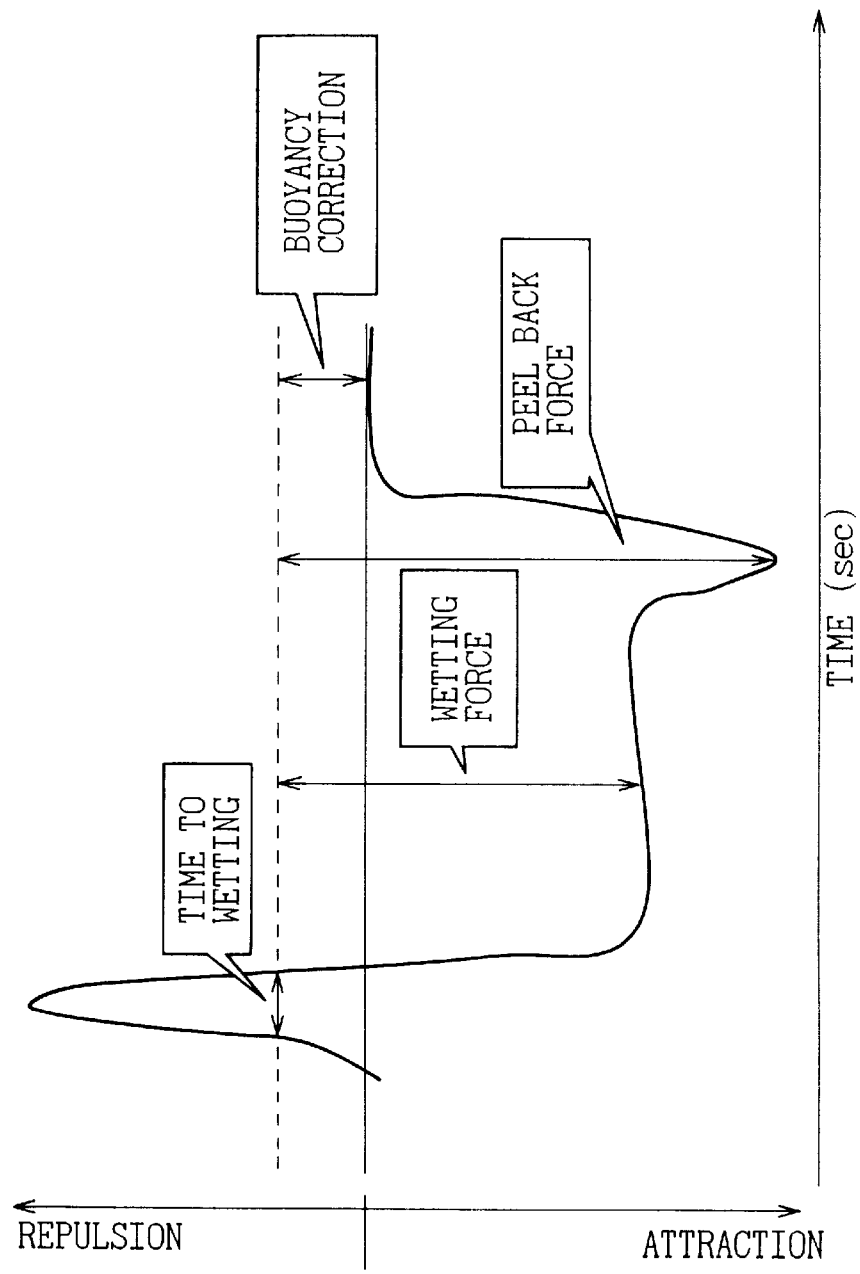
FIG. 1 is a graph showing the meniscus testing method for evaluating the wettability.

Copper plates (5 mm×40 mm×0.1 mm thick) were cleaned with an aqueous solution of hydrochloric acid (about 1.2 mol/liter), applied with an RMA type flux (Tamura Kaken ULF-500VS), and immersed in solder alloy melts held at 240, 250 and 260° C. at an immersing speed of 20 mm/sec to an immersing depth of 5 mm, during which the time to wetting was measured. The measurement time was up to 8 sec. The meniscus test produced a chart as shown in FIG. 1, from which the time to wetting, the wetting force, the peel back force, and other parameters were determined. The time to wetting was selected from these parameters as one most sensitive to the alloy composition to evaluate the wettability.

Measuring Bond Strength

Figure 2:
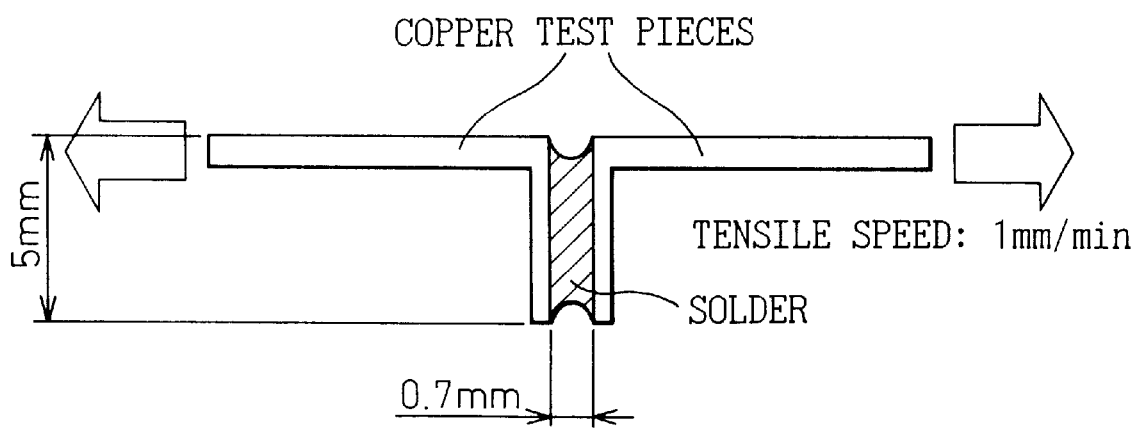
FIG. 2 is a schematic illustration showing the lap joint bond strength testing method.

A lap joint bond strength tester was used to determine the bond strength. As shown in FIG. 2, a pair of L-shaped copper test pieces were solder-bonded and were tested by an Instron Tensile Tester at a tensile speed of 1 mm/min.

Evaluating Measured Data

<Evaluating Melting Point and Wettability>

(1) Zn—Al—Sn Alloys (1st aspect of the present invention)

(1—) Influence of the Zn content

Figure 3:
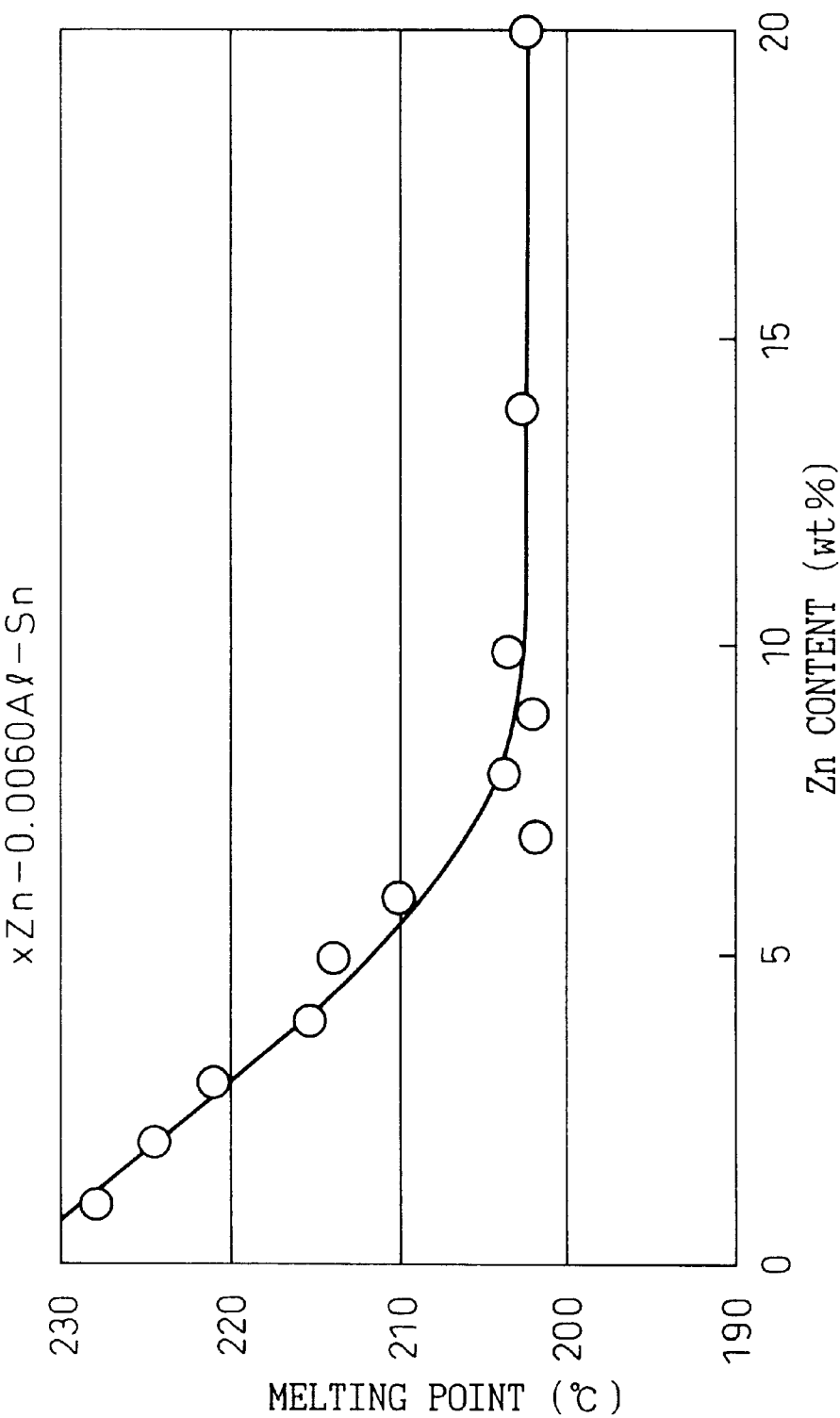
FIG. 3 is a graph showing the relationship between the Zn content and the melting point of X wt % Zn-0.0060 wt % Al—Sn solder alloys.
Figure 4:
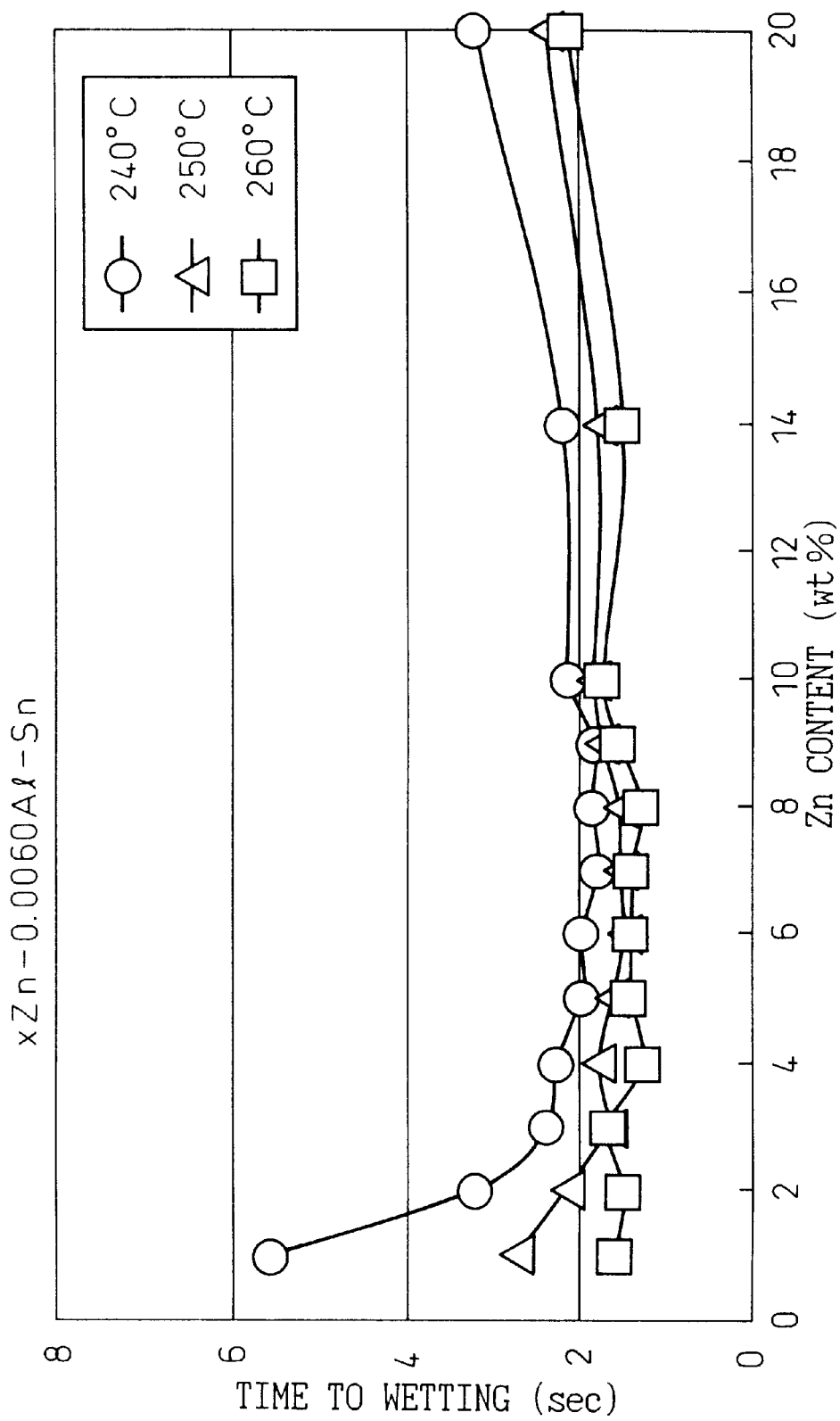
FIG. 4 is a graph showing the relationship between the Zn content and the time to wetting of X wt % Zn-0.0060 wt % Al—Sn solder alloys at different temperatures.

FIGS. 3 and 4 show the relationship between the Zn content and the melting point (liquidus temperature) and the relationship between the Zn content and the time to wetting, respectively, of Samples 1 to 12 (1.0–20.0 wt % Zn-0.0060 wt % Al—Sn) of Table 1. The Al content of 0.0060 wt % is within the specified range of the present invention.

Samples 3 to 11 having the above-mentioned Al content within the specified range and Zn contents within the specified range (3.0–14.0 wt %) had low melting points (FIG. 3) and stably exhibited good wettability (short time to wetting: FIG. 4). In contrast, even with the above-mentioned Al content within the specified range, Samples 1 and 2 having Zn contents less than the specified range and Sample 12 having a Zn content more than the specified range exhibited poor wettability (long time to wetting).

(1-2) Influence of the Al content

Figure 5:
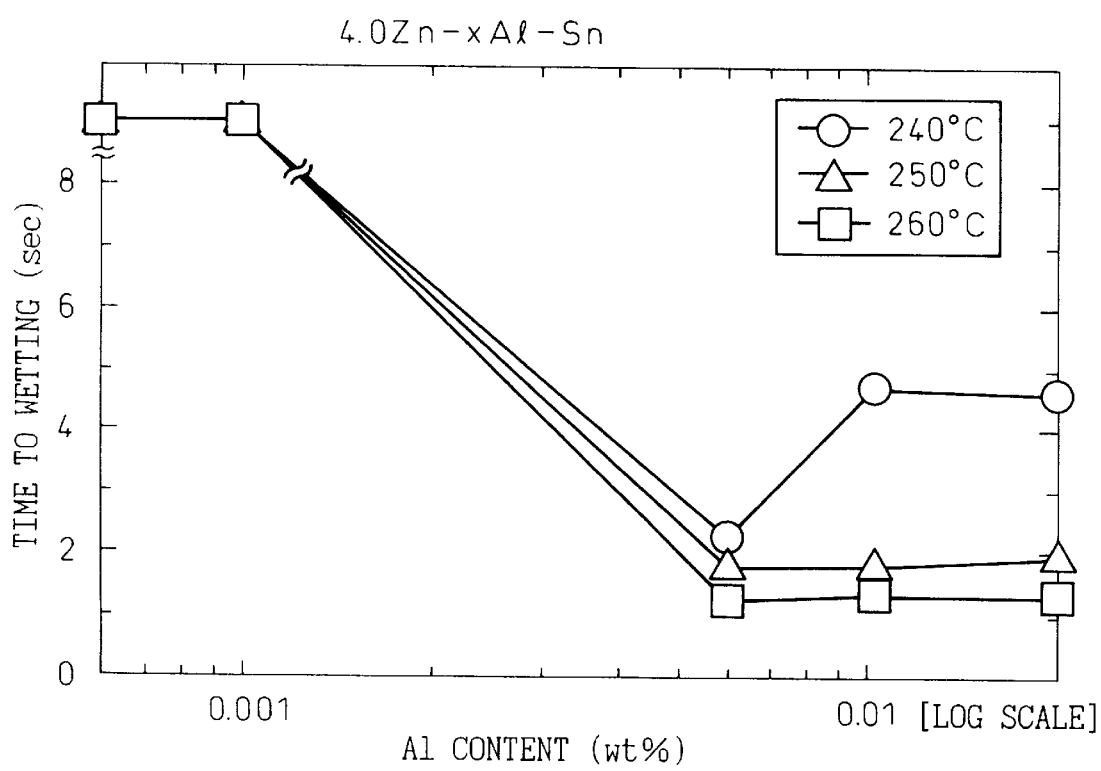
FIG. 5 is a graph showing the relationship between the Al content and the time to wetting of 4 wt % Zn—X wt % Al—Sn solder alloys at different temperatures.
Figure 6:
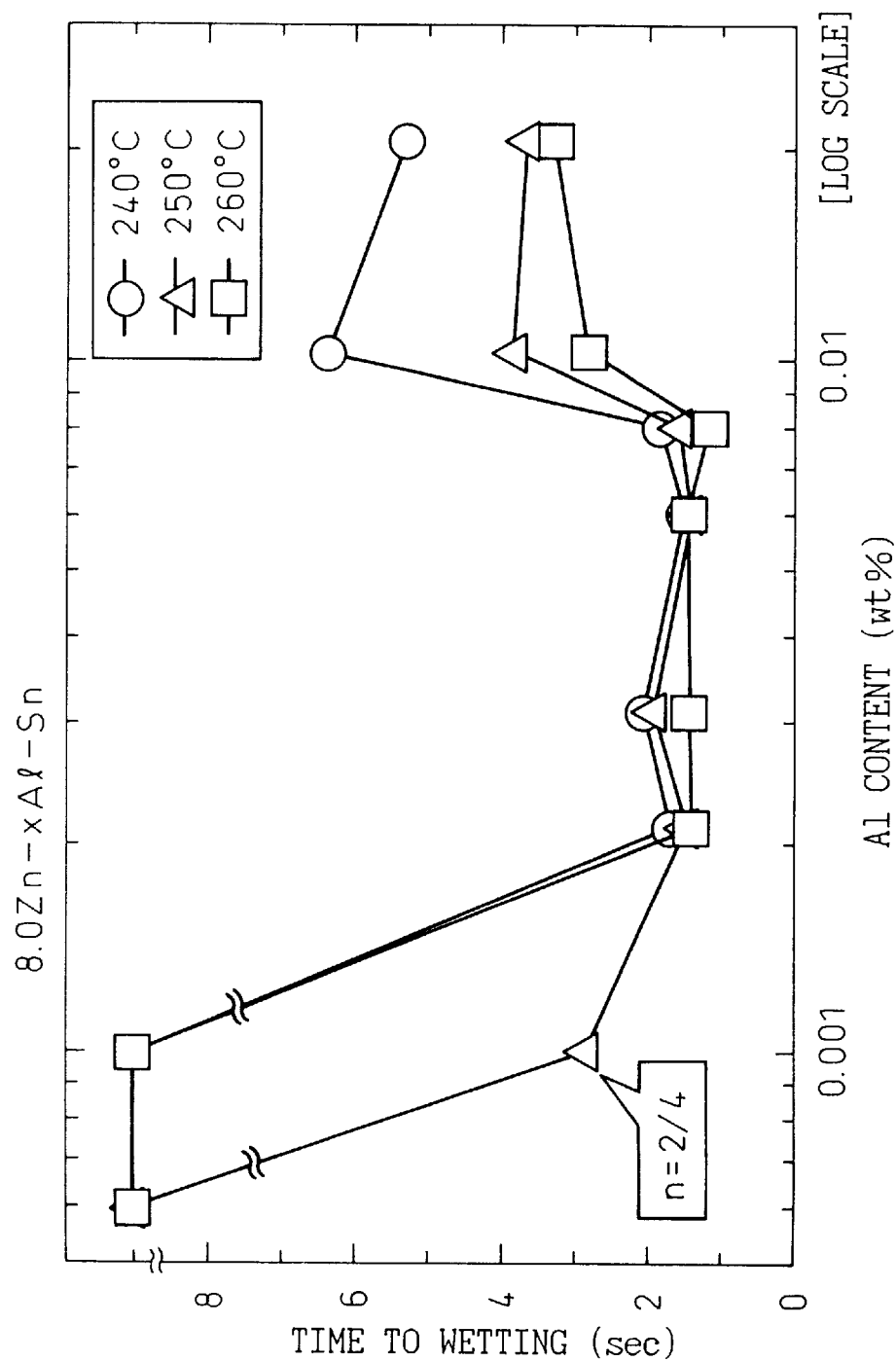
FIG. 6 is a graph showing the relationship between the Al content and the time to wetting of 8 wt % Zn—X wt % Al—Sn solder alloys at different temperatures.
Figure 7:
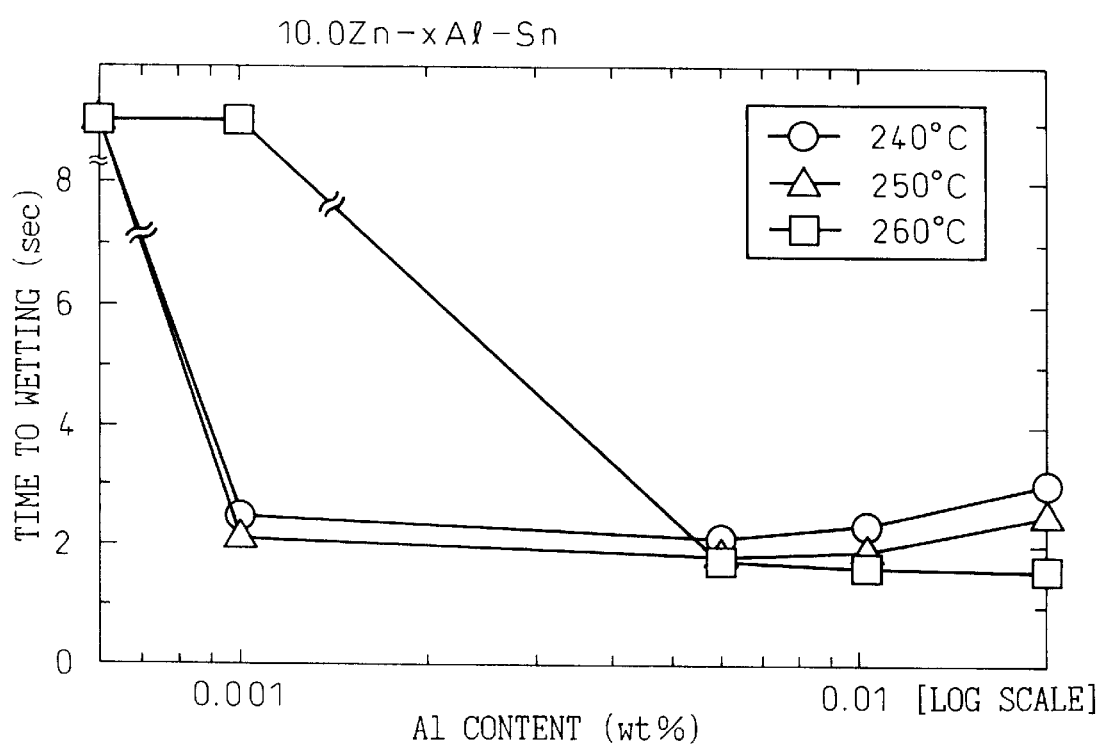
FIG. 7 is a graph showing the relationship between the Al content and the time to wetting of 10 wt % Zn—X wt % Al—Sn solder alloys at different temperatures.

FIGS. 5, 6 and 7 show the relationship between the Al content and the time to wetting of Samples 13 to 17 (4.0 wt % Zn-0.0006–0.0206 wt % Al—Sn), Samples 18 to 29 (8.0 wt % Zn-0.0006–0.7912 wt % Al—Sn), and Samples 30 to 34 (10.0 wt % Zn-0.0006–0.0206 wt % Al—Sn) of Table 1. The Zn contents of 4.0 wt %, 8.0 wt % and 10.0 wt % are all within the specified range of the present invention.

Samples 15, 20 to 23 and 32 having the above-mentioned Zn contents within the specified range and Al contents within the specified range of the first aspect of the present invention stably exhibited good wettability (short time to wetting). In contrast, even with the above-mentioned Zn contents within the specified range, Samples 14, 18 to 19 and 30 to 31 having Al contents less than the specified range and Samples 16 to 17, 24 to 29 and 33 to 34 exhibited poor wettability (long time to wetting).

(2) Zn—Bi—Al—Sn alloys (2nd aspect)

(2-1) Influence of the Zn content

Figure 8:
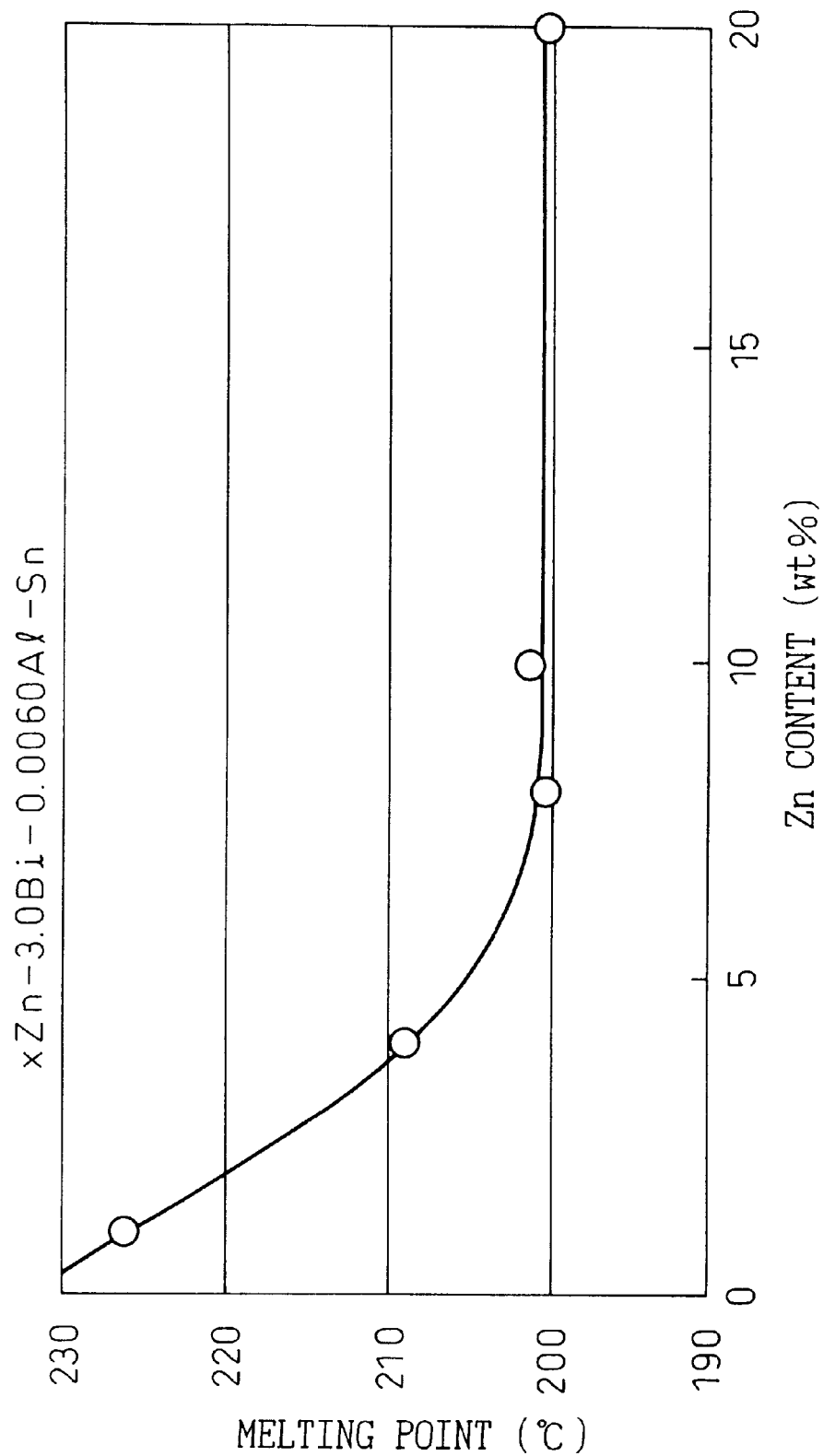
FIG. 8 is a graph showing the relationship between the Zn content and the melting point of X wt % Zn-3 wt % Bi-0.0060 wt % Al—Sn solder alloys.

FIG. 8 shows the relationship between the Zn content and the melting point of Samples 46 to 50 (1.0–20.0 wt % Zn-3.0 wt % Bi-0.0060 wt % Al—Sn) of Table 2. The Bi content of 3.0 wt % and the Al content of 0.0060 wt % are within the respective specified ranges.

Samples having the above-mentioned Bi and Al contents within the respective specified ranges and Zn contents within the specified range had low melting points.

(—) Influence of the Bi content

Figure 9:
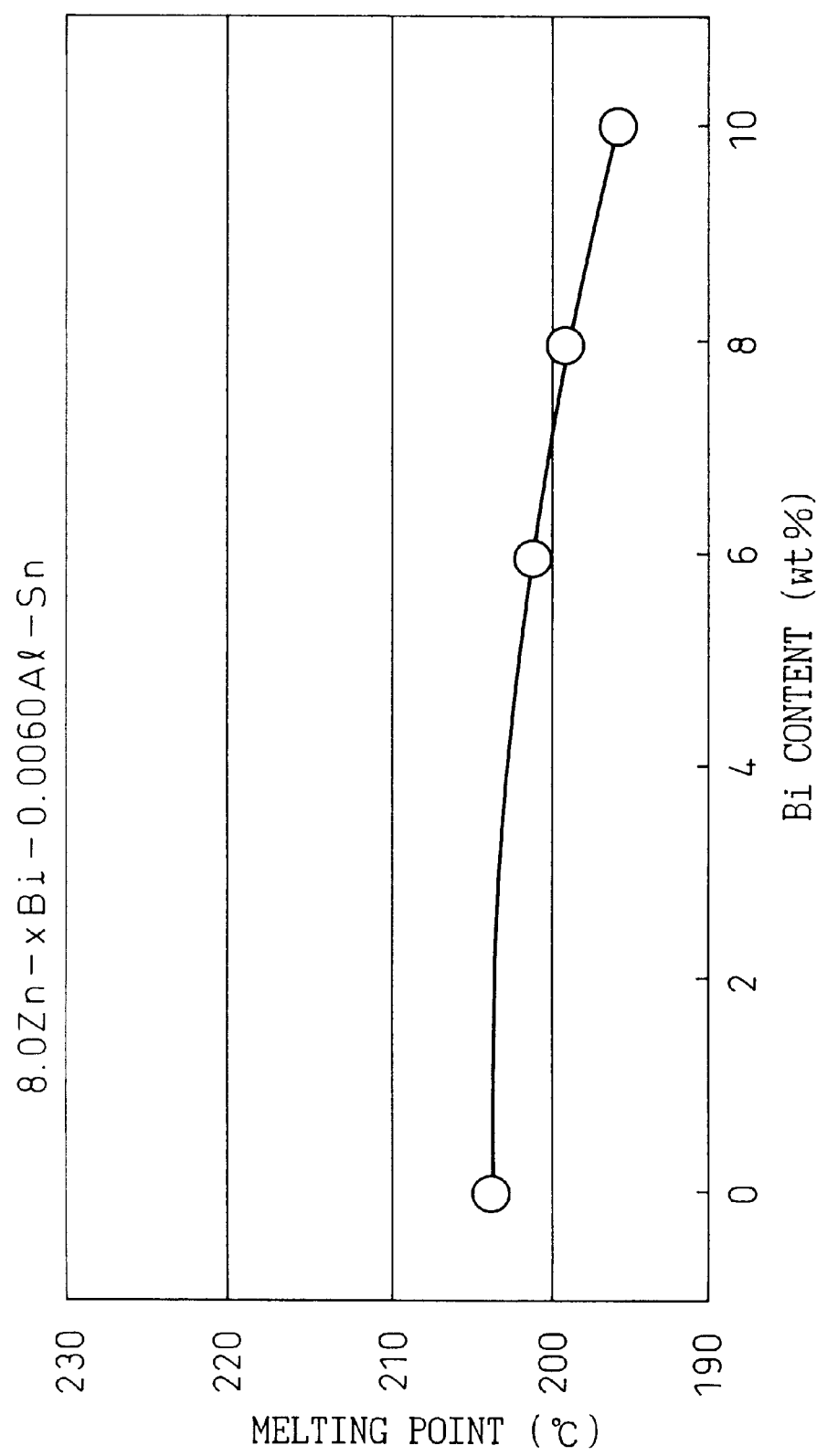
FIG. 9 is a graph showing the relationship between the Bi content and the melting point of 8 wt % Zn—X wt % Bi-0.0060 wt % Al—Sn solder alloys.
Figure 10:
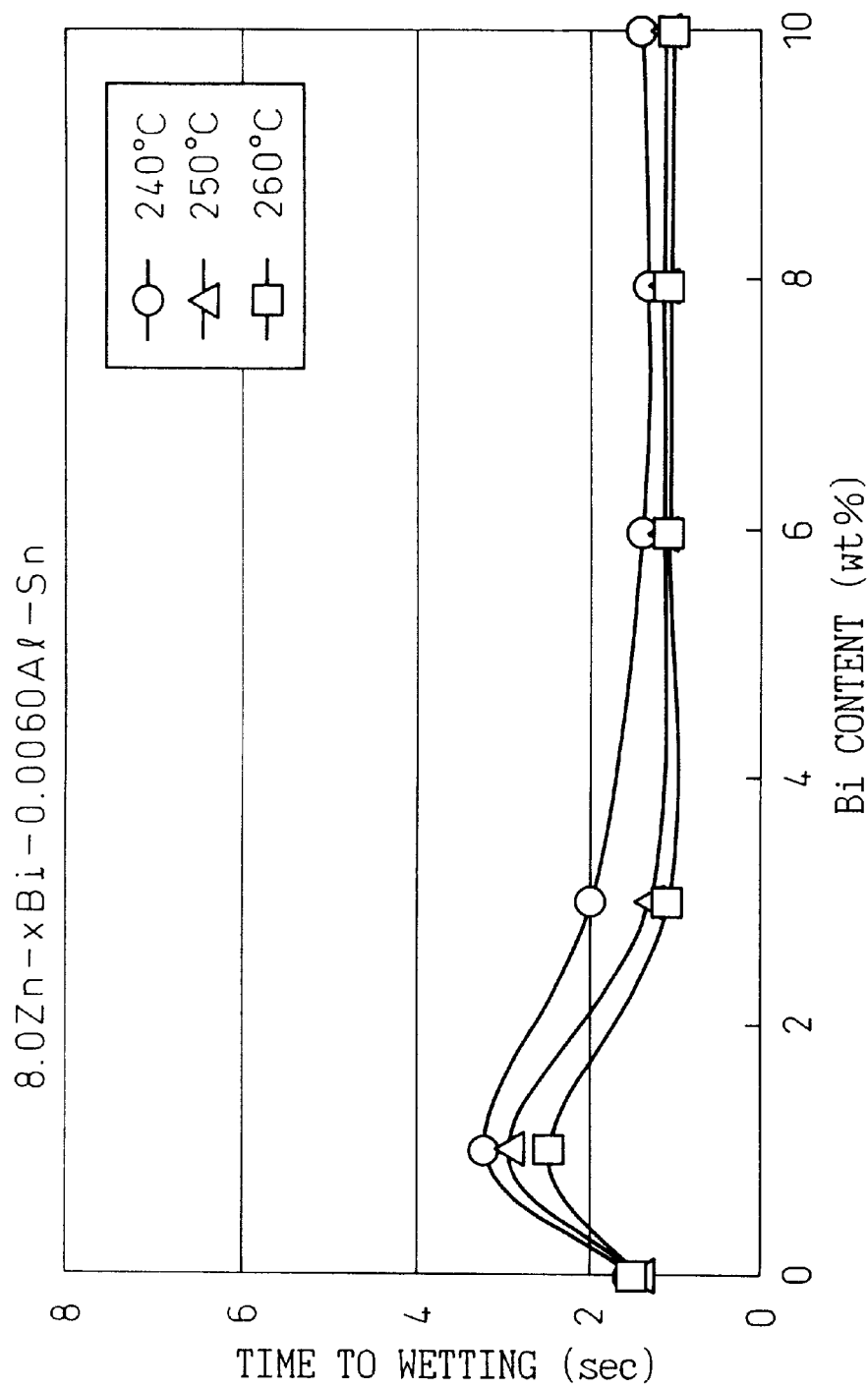
FIG. 10 is a graph showing the relationship between the Bi content and the time to wetting of 8 wt % Zn—X wt % Bi-0.0060 wt % Al—Sn solder alloys at different temperatures.

FIGS. 9 and 10 show the relationship between the Bi content and the melting point and the relationship between the Bi content and the time to wetting, respectively, of Samples 51 to 56 (8.0 wt % Zn-0–10.0 wt % Bi-0.0060 wt % Al—Sn) of Table 2. The Zn content of 8.0 wt % and the Al content of 0.0060 wt % are within the specified range.

Samples 53 to 54 having the above-mentioned Zn and Al contents within the respective specified ranges and Bi contents within the specified range (3.0–6.0 wt %) had low melting points (FIG. 9) and stably exhibited good wettability (short time to wetting: FIG. 10). In contrast, even with the Zn and Al contents within the respective specified ranges, Sample 52 having a Bi content less than the specified range exhibited poor wettability (long time to wetting). Samples 55 to 56 having the Bi contents more than the specified upper limit of 6.0 wt % had low melting temperatures and exhibited good wettability, but the soldered bond had too high a hardness for practical use.

(2-3) Influence of the Al content

Figure 11:
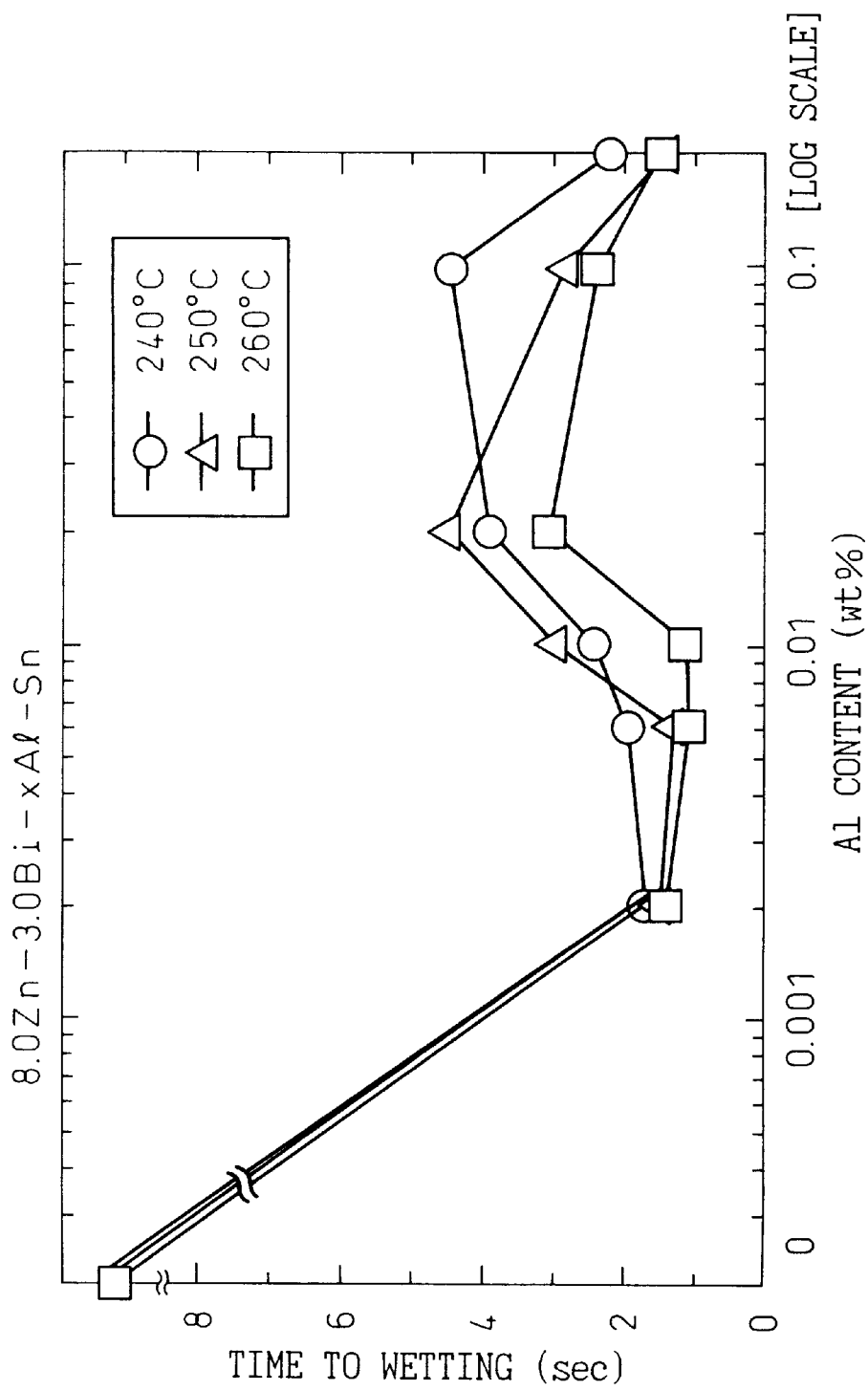
FIG. 11 is a graph showing the relationship between the Al content and the time to wetting of 8 wt % Zn-3 wt % Bi-X wt % Al—Sn solder alloys at different temperatures.

FIG. 11 shows the relationship between the Al content and the time to wetting of Samples 35 to 45 (8.0 wt % Zn-3.0 wt % Bi-0–0.6500 wt % Al—Sn) of Table 2. The Zn content of 8.0 wt % and the Bi content of 3.0 wt % are within the specified range.

Samples 38 to 40 having the above-mentioned Zn and Bi contents within the respective specified ranges and Al contents within the specified range (0.0020–0.0100 wt %) stably exhibited good wettability (short time to wetting). In contrast, even with the Zn and Bi contents within the specified ranges, Samples 35 to 37 having Al contents less than the specified range and Samples 41 to 42 having Al contents more than the specified range exhibited poor wettability (long time to wetting). Samples 43 to 44 having still greater Al contents exhibited an improved wettability (further reduced time to wetting), but will cause a surface segregation of Al during production of solder powder (powder particle size of φ20–45 μm) and are not practically acceptable.

Samples 57 to 65 of Table 2 are comparative samples, in which Sample 57 is a conventional Pb—Sn eutectic solder alloy. The other samples are Sn-based Pb-free solder alloys: Sample 58 of Ag—Cu—Sn, Sample 59 of Zn—Sn, Samples 60 and 61 of Zn—Bi—Sn, Samples 62 and 63 of Zn—Bi—Cu—Sn, Sample 64 of Zn—Bi—Ge—Sn, and Sample 65 of Zn—Bi—Ge—Sn.

Comparative Samples 59, 60, and 62 to 65 had poor wettability and Comparative Sample 58 had good wettability but had a melting point as high as 221.1° C., which is not practically acceptable. Sample 61 having the same alloy composition as that of Sample 60 was tested in a nitrogen atmosphere containing 2000 ppm oxygen and exhibited good wettability only in the non-oxidizing atmosphere, and therefore, is not practically acceptable. The same can be seen in Samples 44 and 45 having a Zn content of 8.0 wt % and a Bi content of 3.0 wt %, which both are in the respective specified ranges, and Al contents more than the specified range (0–0.6500 wt %).

<Evaluating Bond Strength>

Figure 12:
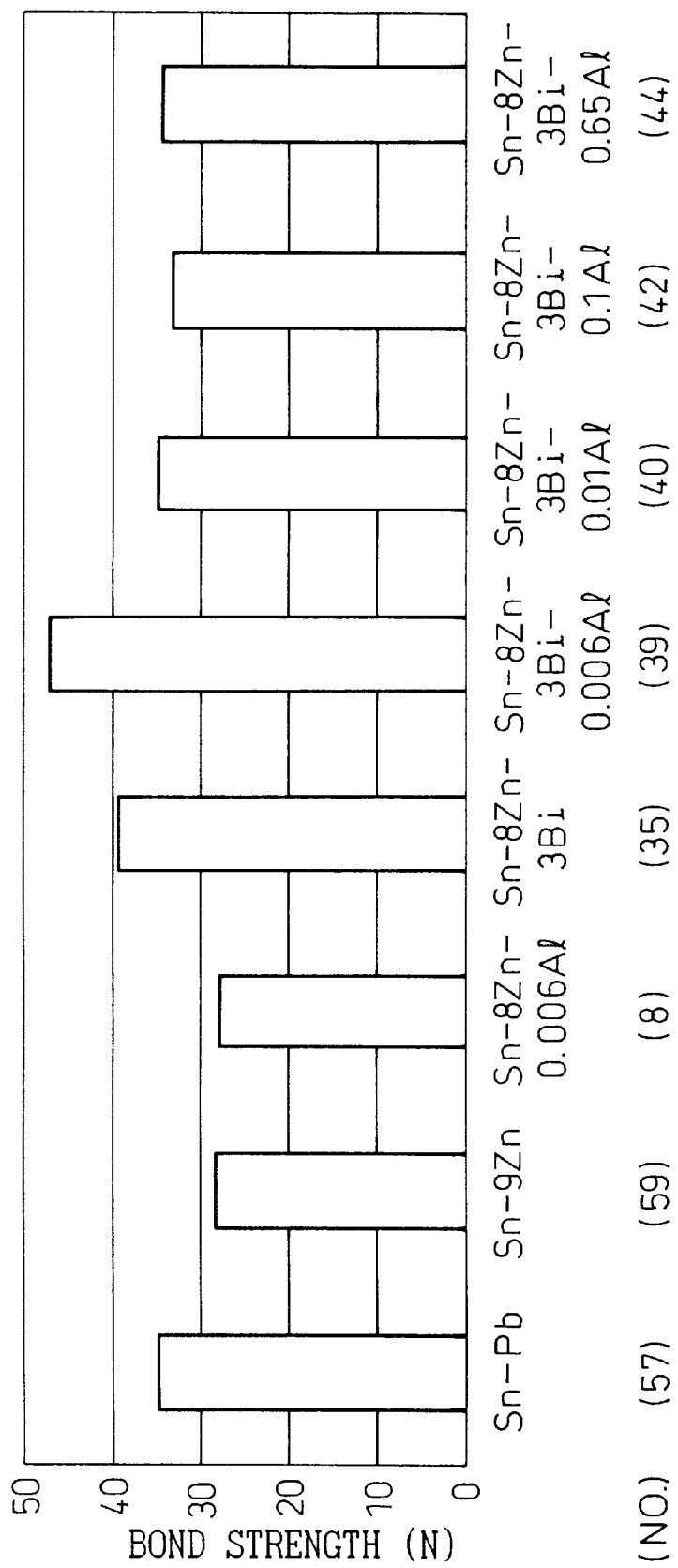
FIG. 12 is a graph comparing the lap joint bond strengths of different solder alloys.

FIG. 12 shows the bond strengths of Sample 8 (8.0 wt % Zn-0.0060 wt % Al—Sn), Sample 39 (8.0 wt % Zn-3.0 wt % Bi-0.0060 wt % Al—Sn) and Sample 40 (8.0 wt % Zn-3.0 wt % Bi-0.0100 wt % Al—Sn), in comparison with those of the conventional Pb—Sn eutectic solder alloy (Sample 57) and Pb-free solder alloys outside the specified range (Samples 35, 42, 44 and 59). As can be seen from FIG. 12, the solder alloys according to the present invention had bond strengths comparable with that of the conventional Pb—Sn eutectic solder alloy.

TABLE 1

Properties of Zn—Al—Sn Solder Alloys

| | Sample No. | Composition (wt %) Zn | Al | Sn | Melting Point (° C.) | Time to Wetting (sec) (Note) 240° C. | | 250° C. | | 260° C. | |
|---|---|---|---|---|---|---|---|---|---|---|---|
| Comparison | 1 | 1.0 | 0.0060 | Bal. | 227.9 | 5.6 | ¼ | 2.8 | ¼ | 1.6 | ¼ |
| | 2 | 2.0 | " | " | 224.4 | 2.6 | ¼ | 2.0 | ¼ | 1.4 | ¼ |
| Invention | 3 | 3.0 | " | " | 221.0 | 2.4 | ¼ | 1.7 | ¼ | 1.7 | ¼ |
| | 4 | 4.0 | " | " | 215.3 | 2.3 | ¼ | 1.8 | ¼ | 1.3 | ¼ |
| | 5 | 5.0 | " | " | 213.8 | 2.0 | ¼ | 1.6 | ¼ | 1.4 | ¼ |
| | 6 | 6.0 | " | " | 209.9 | 2.0 | ¼ | 1.5 | ¼ | 1.4 | ¼ |
| | 7 | 7.0 | " | " | 201.6 | 1.8 | ¼ | 1.5 | ¼ | 1.4 | ¼ |
| | 8 | 8.0 | " | " | 203.5 | 1.5 | ¼ | 1.4 | ¼ | 1.5 | ¼ |
| | 9 | 9.0 | " | " | 201.9 | 1.8 | ¼ | 1.8 | ¼ | 1.5 | ¼ |
| | 10 | 10.0 | " | " | 203.3 | 2.1 | ¼ | 1.8 | ¼ | 1.7 | ¼ |
| | 11 | 14.0 | " | " | 202.5 | 2.2 | ¼ | 1.8 | ¼ | 1.5 | ¼ |

TABLE 1-continued

Properties of Zn—Al—Sn Solder Alloys

|  | Sample No. | Composition (wt %) | | | Melting Point (° C.) | Time to Wetting (sec) (Note) | | |
|---|---|---|---|---|---|---|---|---|
|  |  | Zn | Al | Sn |  | 240° C. | 250° C. | 260° C. |
| Comparison | 12 | 20.0 | " | " | 202.3 | 3.2 4/4 | 2.4 4/4 | 2.2 4/4 |
|  | 13 | 4.0 | 0.0006 | " | 203.1 | x 0/4 | x 0/4 | x 0/4 |
|  | 14 | " | 0.0010 | " | " | x 0/4 | x 0/4 | x 0/4 |
| Invention | 15 | " | 0.0060 | " | " | 2.3 4/4 | 1.8 4/4 | 1.3 4/4 |
| Comparison | 16 | " | 0.0103 | " | " | 4.7 4/4 | 1.8 4/4 | 1.4 4/4 |
|  | 17 | " | 0.0206 | " | " | 4.6 4/4 | 2.0 4/4 | 1.3 4/4 |
|  | 18 | 8.0 | 0.0006 | " | 203.5 | x 0/4 | x 0/4 | x 0/4 |
|  | 19 | " | 0.0010 | " | " | x 0/4 | x 0/4 | x 0/4 |
| Invention | 20 | " | 0.0021 | " | " | 1.7 4/4 | 1.5 4/4 | 1.4 4/4 |
|  | 21 | " | 0.0031 | " | " | 2.1 4/4 | 1.9 4/4 | 1.5 4/4 |
|  | 22 | " | 0.0060 | " | " | 1.5 4/4 | 1.4 4/4 | 1.5 4/4 |
|  | 23 | " | 0.0080 | " | " | 1.9 4/4 | 1.6 4/4 | 1.2 4/4 |
| Comparison | 24 | " | 0.0103 | " | " | 6.4 4/4 | 3.9 4/4 | 2.9 4/4 |
|  | 25 | " | 0.0206 | " | " | 5.3 4/4 | 3.7 4/4 | 3.3 4/4 |
|  | 26 | " | 0.0480 | " | " | 3.2 4/4 | 2.8 4/4 | 2.2 4/4 |
|  | 27 | " | 0.4000 | " | " | 2.5 4/4 | 1.9 4/4 | 1.6 4/4 |
|  | 28 | " | 0.4500 | " | " | 2.3 4/4 | 1.6 4/4 | 1.3 4/4 |
|  | 29 | " | 0.7912 | " | " | 3.1 4/4 | 2.2 4/4 | 1.9 4/4 |
|  | 30 | 10.0 | 0.0006 | " | 203.3 | x 0/4 | x 0/4 | x 0/4 |
|  | 31 | " | 0.0010 | " | " | 2.4 2/4 | 2.1 4/4 | x 0/4 |
| Invention | 32 | " | 0.0060 | " | " | 2.1 4/4 | 1.8 4/4 | 1.7 4/4 |
| Comparison | 33 | " | 0.0103 | " | " | 2.0 4/4 | 2.3 4/4 | 2.3 4/4 |
|  | 34 | " | 0.0206 | " | " | 3.1 4/4 | 2.5 4/4 | 1.6 4/4 |

Note 1: The decimal numbers represent the time to wetting (sec) and the fractional numbers such as "4/4" represent, by the denominator, the numer of measurements and, by the numerator, the number of successful measurements. The symbol "x" means "unmeasureable".
Note 2: The wetting test was carried out in air.
Note 3: Wetting Test Conditions
Counterpart material (Base material):Untreated Cu.
Immersion volume:5 × 40 × 0.1 mm.
Tester: Lesca Meniscus Tester (Solder Checker Model SAT-5000)
Test Flux: RMA type flux, Tamura Kaken ULF-500VS

TABLE 2

Properties of Zn—Bi—Al—Sn Solder Alloys

|  | Sample No. | Composition (wt %) | | | | Melting Point (° C.) | Time to Wetting (sec) (Note) | | |
|---|---|---|---|---|---|---|---|---|---|
|  |  | Zn | Bi | Al | Sn |  | 240° C. | 250° C. | 260° C. |
| Comparison | 35 | 8.0 | 3.0 | — | Bal. | 198.5 | x 0/4 | x 0/4 | x 0/4 |
|  | 36 | " | " | 0.0005 | " | " | x 0/4 | x 0/4 | x 0/4 |
|  | 37 | " | " | 0.0010 | " | " | 1.5 1/4 | 2.2 4/4 | x 0/4 |
| Invention | 38 | " | " | 0.0020 | " | " | 2.4 4/4 | 1.7 4/4 | 1.5 4/4 |
|  | 39 | " | " | 0.0060 | " | " | 2.0 4/4 | 1.3 4/4 | 1.1 4/4 |
|  | 40 | " | " | 0.0100 | " | " | 2.4 4/4 | 3.0 4/4 | 1.1 4/4 |
| Comparison | 41 | " | " | 0.0200 | " | " | 3.9 4/4 | 4.5 4/4 | 3.1 4/4 |
|  | 42 | " | " | 0.1000 | " | " | 4.5 4/4 | 2.8 4/4 | 2.4 4/4 |
|  | 43 | " | " | 0.2000 | " | " | 2.2 4/4 | 1.4 4/4 | 1.5 4/4 |
|  | 44 | " | " | 0.6500 |  |  | 1.4 4/4 | 1.6 4/4 | 1.1 4/4 |
|  | 45 | " | " | 0.6500 |  |  | 0.6 4/4 | 0.4 4/4 | 0.6 4/4 |
|  | 46 | 1.0 | " | 0.0060 | " | 226.1 | 2.1 4/4 | 1.5 4/4 | 1.2 4/4 |
| Invention | 47 | 4.0 | " | " | " | 208.9 | 1.8 4/4 | 1.2 4/4 | 1.1 4/4 |
|  | 48 | 8.0 | " | " | " | 200.2 | 2.0 4/4 | 1.3 4/4 | 1.1 4/4 |
|  | 49 | 10.0 | " | " | " | 201.3 | 1.5 4/4 | 1.7 4/4 | 1.3 4/4 |
| Comparison | 50 | 20.0 | " | " | " | 200.2 | 4.0 3/4 | x 0/4 | 3.4 1/4 |
| Invention | 51 | 8.0 | " | " | " | 203.5 | 1.5 4/4 | 1.4 4/4 | 1.5 4/4 |
| Comparison | 52 | " | 1.0 | " | " | 201.0 | 3.2 4/4 | 2.9 4/4 | 2.5 4/4 |
| Invention | 53 | " | 3.0 | " | " | 200.2 | 2.0 4/4 | 1.3 4/4 | 1.1 4/4 |
|  | 54 | " | 6.0 | " | " | 199.0 | 1.4 4/4 | 1.2 4/4 | 1.1 4/4 |
| Comparison | 55 | " | 8.0 | " | " | 195.7 | 1.4 4/4 | 1.2 4/4 | 1.1 4/4 |
|  | 56 | " | 10.0 | " | " | 195.2 | 1.4 4/4 | 1.2 4/4 | 1.1 4/4 |
|  | 57 | Pb 63.0 | | | " | 183.0 | 1.0 4/4 | 0.8 4/4 | 0.7 4/4 |
|  | 58 | Ag 3.0, Cu 0.7 | | | " | 221.1 | 2.0 4/4 | 1.2 4/4 | 0.9 4/4 |
|  | 59 | 9.0 | — | — | " | 207.0 | x 0/4 | x 0/4 | x 0/4 |
|  | 60 | 8.0 | 3.0 | — | " | 198.5 | x 0/4 | x 0/4 | x 0/4 |
|  | 61 | 8.0 | " | — | " | " | 1.4 4/4 | 0.6 4/4 | 0.8 4/4 |
|  | 62 | 6.1 | " | Cu 0.24 | " | 207.8 | x 0/4 | x 0/4 | x 0/4 |
|  | 63 | 7.4 | " | Cu 0.77 | " | 209.9 | x 0/4 | x 0/4 | x 0/4 |

TABLE 2-continued

Properties of Zn—Bi—Al—Sn Solder Alloys

| Sample No. | Composition (wt %) | | | | Melting Point (° C.) | Time to Wetting (sec) (Note) | | |
|---|---|---|---|---|---|---|---|---|
| | Zn | Bi | Al | Sn | | 240° C. | 250° C. | 260° C. |
| 64 | 7.6 | 2.9 | Ge 0.06 | " | 200.5 | x 0/4 | x 0/4 | x 0/4 |
| 65 | 7.8 | 3.0 | Cu 0.7, Ge 0.05 | " | 204.7 | x 0/4 | x 0/4 | x 0/4 |

Note 1: The decimal numbers represent the time to wetting (sec) and the fractional numbers such as "0/4" represent, by the denominator, the number of measurements and, by the numerator, the number of successful measurements. The symbol "x" means "unmeasureable".
Note 2: The wetting test was carried out in air, except for Samples 45 and 61 tested in nitrogen gas atmosphere containing 2000 ppm oxygen.
Note 3: Wetting Test Conditions
Couterpart material (Base material): Untreated Cu.
Immersion volume: 5 × 40 × 0.1 mm
Tester: Lesca Meniscus Tester (Solder Checker Model SAT-5000)
Test Flux: RMA type flux, Tamura Kaken ULF-500vs As described above, the solder alloys having the chemical compositions within the specified range provide a low melting temperature and good wettability comparable to that of the conventional Pb—Sn solder alloy, without using the environmentally harmful Pb.

Moreover, the solder alloy of the present invention contains inexpensive Zn as the major constituent element and is as inexpensive as the Pb—Sn solder alloy conventionally used in a large amount for electric and electronic devices.

No problems occur if the solder alloy according to the present invention contains minute amounts of oxygen, nitrogen, hydrogen or other impurity elements. However, the oxygen amount should be as small as possible because oxygen, if present in a large amount, would embrittle the solder alloy.

To summarize, the present invention provides a Pb-free solder alloy and a soldered bond using the same, in which the solder alloy has no harmful environmental effect but has a solderability comparable to that of the conventional Pb—Sn solder alloy.

What is claimed is:
1. A solder alloy consisting of:
   Zn: 3.0–14.0 wt %,
   Al: 0.0020–0.0080 wt %, and
   the balance of Sn and unavoidable impurities.
2. A soldered bond of an electric or electronic device, said bond being composed of a solder alloy consisting of:
   Zn: 3.0–14.0 wt %,
   Al: 0.0020–0.0080 wt %, and
   the balance of Sn and unavoidable impurities.
3. A solder alloy consisting of:
   Zn: 3.0–14.0 wt %,
   Bi: 3.0–6.0 wt %,
   Al: 0.0020–0.0100 wt %, and
   the balance of Sn and unavoidable impurities.
4. A soldered bond of an electric or electronic device, said bond being composed of a solder alloy consisting of:
   Zn: 3.0–14.0 wt %,
   Bi: 3.0–6.0 wt %,
   Al: 0.0020–0.0100 wt %, and
   the balance of Sn and unavoidable impurities.

* * * * *